United States Patent
Zou et al.

(10) Patent No.: US 11,814,458 B2
(45) Date of Patent: Nov. 14, 2023

(54) DRAG REDUCING AGENT AND PROCESS OF MANUFACTURE THEREOF

(71) Applicants: Jian Zou, Sugar Land, TX (US); Wojciech Jakubowski, Sugar Land, TX (US)

(72) Inventors: Jian Zou, Sugar Land, TX (US); Wojciech Jakubowski, Sugar Land, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 17/510,770

(22) Filed: Oct. 26, 2021

(65) Prior Publication Data

US 2022/0195098 A1 Jun. 23, 2022

Related U.S. Application Data

(60) Provisional application No. 63/127,930, filed on Dec. 18, 2020.

(51) Int. Cl.
| | |
|---|---|
| *C09K 8/035* | (2006.01) |
| *C08F 293/00* | (2006.01) |
| *C09K 8/82* | (2006.01) |
| *C09K 8/60* | (2006.01) |

(52) U.S. Cl.
CPC .......... *C08F 293/005* (2013.01); *C09K 8/602* (2013.01); *C09K 8/82* (2013.01); *C08F 2438/01* (2013.01); *C08F 2438/02* (2013.01); *C08F 2438/03* (2013.01); *C09K 2208/28* (2013.01)

(58) Field of Classification Search
CPC .............. C08F 293/005; C08F 2438/01; C08F 2438/02; C08F 2438/03; C08F 220/56; C08F 218/08; C08F 220/06; C08F 220/18; C09K 8/602; C09K 8/82; C09K 2208/28; C09K 8/035; C08L 31/04
See application file for complete search history.

(56) References Cited

U.S. PATENT DOCUMENTS

| | | | |
|---|---|---|---|
| 5,449,732 A | 9/1995 | Smith et al. | |
| 5,965,256 A * | 10/1999 | Barrera | B05D 5/083 |
| | | | 427/508 |
| 6,692,156 B1 | 2/2004 | Ohura et al. | |
| 7,119,132 B2 * | 10/2006 | Harris | C08K 5/0025 |
| | | | 526/63 |
| 7,271,205 B2 | 9/2007 | Mathew et al. | |
| 7,285,582 B2 | 10/2007 | Harris et al. | |
| 7,939,584 B2 | 5/2011 | Harris et al. | |
| 9,340,498 B2 | 5/2016 | Rizzardo et al. | |
| 9,650,450 B2 | 5/2017 | Chiefari et al. | |
| 10,442,877 B2 | 10/2019 | Herzog et al. | |
| 10,626,210 B2 | 4/2020 | Hwang et al. | |
| 10,814,605 B2 | 10/2020 | Sumerlin et al. | |
| 10,982,017 B2 | 4/2021 | Zou et al. | |
| 11,199,296 B2 | 12/2021 | Zou et al. | |
| 2001/0049402 A1 | 12/2001 | Foster | |
| 2004/0112995 A1 * | 6/2004 | Harris | C08J 3/124 |
| | | | 241/21 |
| 2005/0049327 A1 | 3/2005 | Jovancicevic et al. | |
| 2011/0213105 A1 | 9/2011 | Jakubowski et al. | |
| 2016/0024369 A1 * | 1/2016 | Mirzaei | C09K 8/64 |
| | | | 507/221 |
| 2017/0130154 A1 | 5/2017 | Kommareddi et al. | |

FOREIGN PATENT DOCUMENTS

CN    111015021 A  *  4/2020   ........... B23K 35/025

OTHER PUBLICATIONS

Cole (Cole D.P. "Synthesis and Characterisation of Water Soluble Polymer Drag Reducing Agents", PhD Thesis, Durham University, 2015).*
Cole, D. P. "Synthesis and Characterisation of Water Soluble Polymer Drag Reducing Agents", PhD Thesis, Durham University, 2015, pages i -xiii, 1-216.
International Search Report for International Application No. PCT/US2021/062394, International Filing Date Dec. 8, 2021, dated Mar. 29, 2022, 5 pages.
Written Opinion for International Application No. PCT/US2021/062394, International Filing Date Dec. 8, 2021, dated Mar. 29, 2022, 4 pages.

* cited by examiner

*Primary Examiner* — Kumar R Bhushan
(74) *Attorney, Agent, or Firm* — CANTOR COLBURN LLP (57) ABSTRACT

A process of manufacturing a composition comprises a particulate drag reducing agent is disclosed. The process comprising: continuously forming a temporary container; introducing an unsaturated monomer component and a radical polymerization component into the temporary container; sealing the temporary container to form a sealed temporary container; allowing the unsaturated monomer component to polymerize in the sealed temporary container to form the drag reducing agent via a radical polymerization reaction, the drag reducing agent having a molecular weight of about 1 million gram/mol to about 50 million gram/mol; and grinding the drag reducing agent to form a composition comprising a particulate drag reducing agent, the particulate drag reducing agent having a particle size of about 1 to about 1,500 microns.

13 Claims, 4 Drawing Sheets

DRAG REDUCING AGENT AND PROCESS OF MANUFACTURE THEREOF

CROSS REFERENCE TO RELATED APPLICATIONS

This application claims the benefit of an earlier filing date from U.S. Provisional Application Ser. No. 63/127,930 filed Dec. 18, 2020, the entire disclosure of which is incorporated herein by reference.

BACKGROUND

Drag reducing agents (DRAs) are additives used to reduce the frictional energy losses of a fluid flowing through a conduit. Drag reducing agents can also increase the flow capacity of an existing pipeline.

Commercial drag reducing agents for heavy crude oils are typically manufactured via emulsion polymerization. The produced drag reducing agents are micron-sized particles and can be used directly without grinding. However, it is desirable to improve the efficiency of the process. Accordingly, there is a need in the art for alternative drag reducing agent formulations and processes that can effectively and efficiently manufacture such formulations.

BRIEF DESCRIPTION

A process of manufacturing a composition comprises a particulate drag reducing agent, the process comprising: continuously forming a temporary container; introducing an unsaturated monomer component and a radical polymerization component into the temporary container; sealing the temporary container to form a sealed temporary container; allowing the unsaturated monomer component to polymerize in the sealed temporary container to form the drag reducing agent via a radical polymerization reaction, the drag reducing agent having a molecular weight of about 1 million gram/mol to about 50 million gram/mol; and grinding the drag reducing agent to form a composition comprising a particulate drag reducing agent, the particulate drag reducing agent having a particle size of about 1 to about 1,500 microns.

A composition comprises, based on the total weight of the composition: about 0.5 wt % to about 80 wt % of a particulate drag reducing agent polymerized from a vinyl acetate, styrene, acrylamide, an acrylate, acrylic acid, a derivative thereof, or a combination thereof, the particulate drag reducing agent having a particle size of about 1 micron to about 1,500 microns and a molecular weight of about 1 million to about 50 million gram/mol; about 0.1 wt % to about 40 wt % of an anti-agglomerating agent polymer; about 0.001 wt % to 19.99 wt % of a viscosifier; about 20 wt % to about 90 wt % of a non-solvent; optionally about 0.001 wt % to about 8.99 wt % of the dissolved or particulate container material; and optionally about 0.1 wt % to 10 wt % of the surfactant.

BRIEF DESCRIPTION OF THE DRAWINGS

The following descriptions should not be considered limiting in any way. With reference to the accompanying drawings, like elements are numbered alike.

DETAILED DESCRIPTION

The inventors have discovered a process that uses a sealed temporary container as a reaction vessel to make drag reducing agents via a radical polymerization reaction. The process can effectively and efficiently transfer heat outside of the container without using any mechanical agitators.

The temporary container can be an excellent barrier for oxygen, moisture, and outside liquid or gas. Thus the temporary container may not need to be placed in an inert atmosphere during the polymerization reaction.

When no longer needed, the temporary container can be removed or ground together with the drag reducing agent, avoiding the cost associated with building, using, or cleaning conventional reactors.

Temporary containers can be continuously made from a container material. Suitable container materials are those that can form a film. Examples of container materials include but are not limited to, a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing. Examples of polysaccharide and polysaccharide derivative include chitin, chitosan, chemically modified cellulose, and a chemically modified starch. As used herein, chemically modified cellulose and chemically modified starch refer to cellulose or starch which have been chemically treated such that the modified material is dissolvable in water and/or a polar solvent and can form a film. Examples of chemically modified starch include starch acetate. Examples of chemically modified cellulose include cellulose acetate and cellulose triacetate. More than one container materials can be used.

Temporary containers can have a single layered structure or a multi-layered structure. A single layer structure means that the temporary container has only one layer, and that layer is made from the container material as disclosed herein. A multi-layered structure means that the temporary container has two or more layers, wherein at least one layer is made from the container material as disclosed herein. Without wishing to be bound by theory, it is believed that when the temporary containers are constructed with multiple layers of different materials, their oxygen and/or moisture barrier performance, mechanic strength, and sealing properties can be further improved, and dissolution of the container material can be fine-tuned.

In a continuous process, the container materials can be provided as a continuous sheet, which is sealed by heat or adhesive after the unsaturated monomers and the radical polymerization components are introduced. Co-extrusion, lamination, or other methods known in the art can be used to produce temporary containers having a multi-layered structure. In a temporary container having a multi-layered structure, the layer that faces the polymer products or the reaction mixtures used to form the polymer products is referred to as an inner layer, and the layer defines the exterior of the temporary container is referred to as an outer layer. The layer that includes the container material as disclosed herein can be an inner layer or an outer layer of the temporary container. In an embodiment, each layer of the multi-layer structure independently comprises a container material as disclosed herein. Between different layers, it may or may not require an adhesive layer.

Optionally temporary containers can be coated with wax, a silicone, phenolic resin, or a combination comprising at least one of the foregoing. The wax can be a natural wax or a synthetic wax. Examples of suitable naturally occurring wax materials include beeswax, candelilla wax, carnauba wax, ozokerite wax, ceresin wax, montan wax. Synthetic waxes include paraffin waxes, and polymers under the tradenames VYBAR™ and POLYWAX™. As used herein, silicone includes silicone oils. In an embodiment, the silicone in the coating is polydimethylsiloxane (PDMS). Phenolic resins include polymers obtained by the reaction of phenol or substituted phenol with formaldehyde.

The coating can be disposed on an inner surface of the temporary containers, an outer surface of the temporary containers, or both the inner surface and the outer surface of the temporary containers. As used herein, an inner surface of the temporary containers means the surface that would otherwise be in direct physical contact with the polymer products, or the reaction mixtures to produce the polymer products when the coating is not present. The outer surface refers to a surface that is opposed to the inner surface. The coating material can be sprayed onto the inner and/or outer surfaces of the temporary containers in situ during a continuous process.

The coating can reduce the tendency of the temporary containers sticking to the manufacturing equipment, especially during the heat sealing step to seal the containers. The coating can further tune the barrier performance of the temporary containers.

The temporary containers may have different shapes such as sphere, cylinder, rectangular cube, cube, or irregular shapes. The temporary contains can have a volume of about 1 milliliter to about 10 liters, preferably between about 1 milliliter and about 5 liters, and more preferably between about 10 milliliters and about 1 liter. In another aspect, the temporary containers have a weight capacity of about 1 gram to about 25,000 grams, preferably about 10 grams to about 2,500 grams. The temporary containers can have a wall thickness of about 1 to about 2,000 microns, preferably about 10 to about 100 microns. Because of the relatively small size of these temporary containers compared to the size of industrial polymerization reactors, these temporary containers have a much larger surface-to-volume ratio than industrial polymerization reactors do, therefore, have much better heat transfer and much easier temperature control during the polymerization process. The small size of temporary containers also allows the light to penetrate them more efficiently than industrial polymerization reactors. This is important when electromagnetic energy is used to initiate and or control radical polymerization process.

After the temporary containers are formed, unsaturated monomer components and radical polymerization components are introduced into the temporary containers. The unsaturated monomer components can include an unsaturated monomer. As used herein, unsaturated monomers refer to any unsaturated monomer that can be polymerized by radical polymerization to produce a drag reducing agent for crude oils. Examples of unsaturated monomers include, but are not necessarily limited to the compounds having a structure represented by Formula (I)

Formula (I)

where $R_1$ is H or a C1-C10 substituted or unsubstituted alkyl group, $R_2$ is H, a C1-C40 substituted or unsubstituted alkyl group, a C5-C30 substituted or unsubstituted cycloalkyl group, a C6-C20 substituted or unsubstituted aryl group; vinyl acetate; styrene; acrylamide and derivatives thereof.

Examples of unsaturated monomers include but are not limited to, acrylic acid; methacrylic acid; ethacrylic acid; methyl acrylate; ethyl acrylate; n-butyl acrylate; iso-butyl acrylate; t-butyl acrylate; 2-ethylhexyl acrylate; decyl acrylate; octyl acrylate; cyclohexyl acrylate; dodecyl acrylate; heptyl acrylate; methyl methacrylate; ethyl methacrylate; n-butyl methacrylate; iso-butyl methacrylate; t-butyl methacrylate; 2-ethylhexyl methacrylate; decyl methacrylate; methyl ethacrylate; ethyl ethacrylate; n-butyl ethacrylate; iso-butyl ethacrylate; t-butyl ethacrylate; 2-ethylhexyl ethacrylate; decyl ethacrylate; 2,3-dihydroxypropyl acrylate; 2,3-dihydroxypropyl methacrylate; ethylene glycol methacrylate; 2-hydroxyethyl acrylate; 2-hydroxypropyl acrylate; hydroxypropyl methacrylate; glyceryl monoacrylate; glyceryl monoethacrylate; glycidyl methacrylate; glycidyl acrylate; benzyl acrylate; 4-butoxycarbonylphenyl acrylate; 4-cyanobutyl acrylate; 3-methoxybutyl acrylate; 3-methoxypropyl acrylate; diethyleneglycolethyl acrylate; PEG-methacrylate; 2-(dimethylamino)ethyl methacrylate; 2-(trimethylamino)ethyl methacrylate; acrylamide; methacrylamide; ethacrylamide; N-methyl acrylamide; N,N-dimethyl acrylamide; N,N-dimethyl methacrylamide; N-ethyl acrylamide; N-isopropyl acrylamide; N-butyl acrylamide; N-t-butyl acrylamide; N,N-di-n-butyl acrylamide; N,N-diethylacrylamide; N-octyl acrylamide; N-octadecyl acrylamide; N-phenyl acrylamide; N-methyl methacrylamide; N-ethyl methacrylamide; N-dodecyl methacrylamide; N,N-dimethylaminoethyl acrylamide; quaternised N,N-dimethylaminoethyl acrylamide; N,N-dimethylaminoethyl methacrylamide; quaternised N,N-dimethylaminoethyl methacrylamide; N-isopropylacrylamide; N,N-dimethylaminoethyl acrylate; N,N-dimethylaminoethyl methacrylate; quaternised N,N-dimethylaminoethyl methacrylate; quaternised N,N-dimethyl-aminoethyl acrylate; 2-hydroxyethyl methacrylate; 2-hydroxyethyl ethacrylate; N,N-dihydroxyethylacrylamide, glyceryl acrylate; 2-methoxyethyl acrylate; 2-methoxyethyl methacrylate; 2-methoxyethyl ethacrylate; 2-ethoxyethyl acrylate; 2-ethoxyethyl methacrylate; 2-ethoxyethyl ethacrylate; maleic acid; maleic anhydride and its half esters; styrene optionally substituted with one or more C1-C12 straight or branched chain alkyl groups, such as alpha-methylstyrene, t-butylstyrene, and p-methylstyrene; and vinyl acetate.

Radical polymerization can be carried out in the sealed containers. The radical polymerization can be a free-radical polymerization or a controlled radical polymerization (CRP). CRP can include atom transfer radical polymerization (ATRP), reversible addition/fragmentation chain transfer polymerization (RAFT), nitroxide-mediated polymerization (NMP), or other known controlled radical polymerization techniques.

When the radical polymerization reaction is a free-radical polymerization reaction, the radical polymerization components can comprise a free-radical initiator and an optional component, where the optional component comprises a solvent, a chain transfer agent, or a combination comprising at least one of the foregoing.

Free-radical initiators can be used to initiate the free-radical polymerization. Free-radical initiators include compounds that decompose to generate radicals with moderate heating such as organic peroxides and azo compounds, redox initiators that generate radicals by the combinations of oxidizing agents and reducing agents, and photochemical initiators that decompose or cleave into radicals with lights. Examples of initiators include but are not limited to 2,2'-azobis(2-methylpropionitrile (AIBN); a peroxide, for example, benzoyl peroxide (BPO), lauroyl peroxide, or cyclohexanone peroxide; a peroxy acid, for example, peroxyacetic acid or peroxybenzoic acid; tert butyl peracetate; 1,1-bis(tert-butylperoxy)-3,3,5-(dibutylphthalate)trim ethylcyclohexane: 2,2'-azobis(4-methoxy-2,4-dimethyl Valeronitrile) (V-70): 2,2'-azobis(2.4-dimethyl valeronitrile) (V-65); dimethyl 2,2'-azobis(2-methylpropionate) (V-601): 2,2'-azobis(2-methylbutyronitrile) (V-59); 1,1'-azo bis(cyclohexane-1-carbonitrile) (V-40): 2,2'-azobisN-(2-propenyl)-2-methylpropionamide (VF-096); 4,4'-azobis(4-cyanovaleric acid) (ACVA), an Irgacure™ initiator (e.g., Irgacure™ 2959), 2-hydroxy-4'-(2-hydroxyethoxy)-2-methylpropiophenone, 2,2'-azobis[2-(2-imidazolin-2-yl)propane]disulfate dihydrate (VA-046B), 2,2'-azobis(2-methylpropionamidine)dihydrochloride (V-50), 2,2'-azobis[2-(2-imidazolin-2-yl)propane]dihydrochloride (VA-044), 2,2-dimethoxy-2-phenylacetophenone (DMPA), a photoiniferters, for example, thiocarbonylthio, trithiocarbonates, disulfides, tetraethylthiuram disulfide (TTDS), dibenzoyl disulfide (DBDS), S-benzyl N,N-diethyldithiocarbamate (BDT), p-xylylene bis(N,N-diethyldithiocarbamate) (XDT); a photoinitiators, for example, benzoins, e.g., benzoin, benzoin ethers such as benzoin methyl ether, benzoin ethyl ether, benzoin isopropyl ether, benzoin phenyl ether, and benzoin acetate; acetophenones, e.g., acetophenone, 2,2-dimethoxyacetophenone, 2,2-dimethoxy-2-phenylacetophenone and 1,1-dichloroacetophenone; benzyl ketals, e.g., benzyl dimethylketal and benzyl diethyl ketal; anthraquinones, e.g., 2-methylanthraquinone, 2-ethylanthraquinone, 2-tertbutylanthraquinone, 1-chloroanthraquinone and 2-amylanthraquinone; triphenylphosphine; benzoylphosphine oxides, e.g., 2,4,6-trimethylbenzoyl-diphenylphosphine oxide; ethyl-2,4,6-trimethylbenzoylphenylphosphinate; bisacylphosphine oxides; benzophenones, e.g., benzophenone and 4,4'-bis(N,N'-dimethylamino)benzophenone; thioxanthones and xanthones; acridine derivatives; phenazine derivatives; quinoxaline derivatives; 1-phenyl-1,2-propanedione 2-O-benzoyl oxime; 4-(2-hydroxyethoxy)phenyl-(2-propyl)ketone; 2-methyl-1-[4-(methylthio)phenyl]-2-(4-morpholinyl)-1-propanone; 1-aminophenyl ketones or 1-hydroxy phenyl ketones, e.g., 1-hydroxycyclohexyl phenyl ketone, 2-hydroxyisopropyl phenyl ketone, phenyl 1-hydroxyisopropyl ketone, and 4-isopropylphenyl 1-hydroxyisopropyl ketoneor, derivatives or combinations thereof.

Regents used in ATRP are known and have been described, for example, in US 2011/0213105. During an ATRP process, unsaturated monomer components are polymerized in the presence of an ATRP initiator, optionally a metal catalyst, optionally a ligand, optionally a photocatalyst, optionally a reducing agent, and optionally a solvent. Accordingly, when the radical polymerization reaction is an ATRP reaction, the radical polymerization component charged into the temporary container can comprise an ATRP initiator and an optional component which includes a metal catalyst, a ligand, a photocatalyst, a reducing agent, a solvent, or a combination comprising at least one of the foregoing.

The term "ATRP initiator" is understood to mean a molecule comprising one or more transferable atoms or groups, wherein the initiator is capable of decomposing to provide an activated species capable of reacting with unsaturated monomers to form polymeric components. For example, the initiator may be an alkyl-containing molecule comprising one or more transferable atoms or groups, such as a halide-substituted alkyl initiator, wherein the halide is the transferable atom or group.

Suitable ATRP initiators may include, but are not limited to, alkyl halides or substituted alkyl halides, such as diethyl 2-bromo-2-methylmalonate (DEBMM); ethyl 2-bromoisobutyrate (EBiB); methyl 2-bromopropionate (MBP); ethyl 2-chloroisobutyrate (ECiB); 1,2-bis(2-bromoisobutyryloxy)ethane (2f-BiB); ethyl α-bromophenylacetate (EBPA); methyl α-bromoisobutyrate (MBIB); ethyl α-bromoisobutyrate (EBIB); a low molecular weight initiator comprising one or more transferable atoms or groups, such as a substituted alkyl halide attached to a low molecular weight molecule, or a substituted alkyl halide attached to a low molecular weight molecule having an additional non-initiating functionality; a macroinitiator having one or more transferable atoms or groups, such as a polymeric component comprising an alkyl halide moiety, for example, a polystyrene block having a halide at a terminal end; a solid inorganic material with tethered initiating groups; or an organic material with tethered initiating groups. Other suitable ATRP initiators can be found in US 2011/0213105.

Suitable metal catalysts that may be useful in ATRP processes may include metals such as transition metals, like $Cu^0$, that may convert to an oxided metal in situ and/or those represented by Formula (3): $M_t^{+n}X'_n$ (3), wherein $M_t^{+n}$ may comprise $Cu^{+1}$; $Cu^{+2}$; $Fe^{+2}$; $Fe^{+3}$; $Ru^{+2}$; $Ru^{+3}$; $Cr^{+2}$; $Cr^{+3}$; $Mo^{+2}$; $Mo^{+3}$; $W^{+2}$; $W^{+3}$; $Mn^{+3}$; $Mn^{+4}$; $Rh^{+3}$; $Rh^{+4}$; $Re^{+2}$; $Re^{+3}$; $Co^{+1}$; $Co^{+2}$; $V^{+2}$; $V^{+3}$; $Zn^{+1}$; $Zn^{+2}$; $Au^{+1}$; $Au^{+2}$; $Ag^{+1}$; and $Ag^{+2}$; wherein X' may comprise halogen; C1-C6-alkoxy; $(SO_4)_{1/2}$; $(PO_4)_{1/3}$; $(R^1PO_4)_{1/2}$; $(R^1_2PO_4)$; triflate; hexafluorophosphate; methanesulfonate; arylsulfonate; CN; and $R^2CO_2$; wherein $R^1$ may comprise aryl or a straight or branched C1-C20 alkyl group, such as C1-C10 alkyl group, or where two $R^1$ groups may be joined to form a 5-, 6-, or 7-membered heterocyclic ring; wherein $R^2$ may comprise hydrogen or a straight or branched C1-C6 alkyl group which may be substituted from 1 to 5 times with a halogen; and wherein n is the formal charge on the metal, and has a value between 0 and 7.

Suitable ligands that may be useful in ATRP processes include those that may be capable of forming a complex with an active metal-halide catalyst may include, but are not limited to, tris(2-pyridylmethyl)amine (TPMA); tris[2-(dimethylamino)ethyl]amine (Me6TREN); N,N,N',N'',N''-pentamethyldiethyletriamine (PMDETA); N,N,M,N',N'',N'''-hexamethyltriethylenetetramine (HMTETA); 4,4'-dinonyl bipyridine (dNbipy); or bipyridine (bipy). Additional ligands are described in US 2011/0213105.

Reducing agent may be used in an ATRP process. "Reducing agent" is understood to mean any reducing agent capable of reducing the transition metal catalyst from a higher oxidation state to a lower oxidation state, thereby reforming the catalyst activator state. For example, the reducing agent may be free-radical initiator. The reducing agent may initiate and/or perpetuate a polymerization reaction, such as an ATRP polymerization reaction, by generating or regenerating the active metal catalyst from the inactive metal catalyst. Such reducing agents include, but are not limited to, $SO_2$, sulfites, bisulfites, thiosulfites, mercaptans, hydroxylamines, hydrazine ($N_2H_4$), phenylhydrazine ($PhNHNH_2$), hydrazones, hydroquinone, food preservatives, flavonoids, beta carotene, vitamin A, .alpha.-tocopherols, vitamin E, propyl gallate, octyl gallate, BHA, BHT, propionic acids, ascorbic acid, sorbates, reducing sugars, sugars comprising an aldehyde group glucose, lactose, fructose, dextrose, potassium tartrate, nitrites, nitrites, dextrin, aldehydes, glycine, and transition metal salts.

Photocatalyst may be used in an ATRP process. "Photocatalyst" is understood to mean any organic compound which under photoexcitation using electromagnetic energy will activate ATRP initiator (e.g. alkyl halide) to carbon-centered radical, which can than react with monomer. Suitable photocatalysts may include, but are not limited to phenothiazines, dihydrophenazines, phenoxazines, perylene, pyrene, thienothiophenes, thienothiophenes, 10-phenylphenothiazine (Ph-PTH), fluorescein, benzo[b]-phenothiazine (Ph-benzoPTZ), 1,2,3,5-tetrakis(carbazol-9-yl)-4,6-dicyanobenzene (4CzIPN), 4-[2-(4-diphenylamino-phenyl)thieno[3,2-b]thiophen-3-yl]benzonitrile (TT-TPA), Eosin Y, 3,7-di(2-naphthyl)-2-naphthalene-10-phenoxazine (Dinapht-PhenO) and certain dye/amine combinations.

Controlled polymerization by RAFT occurs via rapid chain transfer between growing polymer radicals and dormant polymer chains. After initiation, the control agent becomes part of the dormant polymer chain. When the radical polymerization reaction is a RAFT reaction, the radical polymerization component can comprise a RAFT initiator, a RAFT agent, and optionally a solvent.

The RAFT initiator can be a free-radical initiator. In some cases, the RAFT initiator may comprise a photoinitiator, a thermal initiator, and/or a redox initiator. In certain embodiments, the initiator is an azo initiator. Non-limiting examples of suitable initiators include azobisisobutyronitrile (AIBN), 4,4'-azobis(4-cyanovaleric acid) (ACVA), an Irgacure™ initiator (e.g., Irgacure™ 2959), 2-hydroxy-4'-(2-hydroxy-ethoxy)-2-methylpropiophenone, 2,2'-azobis[2-(2-imidazolin-2-yl)propane]disulfate dihydrate (VA-046B), 2,2'-azobis [2-(2-imidazolin-2-yl)propane]dihydrochloride (VA-044), and 2,2-dimethoxy-2-phenyl-acetophenone (DMPA).

RAFT agents can be used and may contain thiocarbonyl-thio groups, and include, for example, dithioesters, dithiocarbamates, trithiocarbonates and xanthenes. Examples of useful RAFT agents include those described in "The Chemistry of Radical Polymerization", Graeme Moad & David H. Solomon, $2^{nd}$ rev. ed., 2006, Elsevier, p. 508-514.

Additional RAFT reagents and process conditions are also known and have been described, for example, in U.S. Pat. Nos. 9,650,450, 10,442,877, 9,340,498, 10,814,605, and 10,626,210.

NMP achieves control with dynamic equilibrium between dormant alkoxyamines and actively propagating radicals. When the radical polymerization reaction is an NMP reaction, the radical polymerization component introduced into the temporary container can comprise a nitroxide, an NMP initiator, and optionally a solvent.

Many different types of nitroxides have been described and there are many methods for producing nitroxides in-situ. Examples of useful NMP initiators include those described in "The Chemistry of Radical Polymerization", Graeme Moad & David H. Solomon, 2nd rev. ed., 2006, Elsevier, p. 473-475. An example of a commercially available NMP initiator is BlocBuilder™, an alkoxyamine compound, available from Arkema. Additional materials and reaction conditions have been described, for example, in U.S. Pat. No. 6,692,156 and Chemical Reviews 2001, 101, 3661-3688.

Chain transfer agents can be added during radical polymerization to control the chain length of the polymer product. Chain transfer agents can include halogen compounds, aromatic hydrocarbons, and thiols (mercaptans). Examples of chain transfer agents include 4,4'-thiobisbenzenethiol, tert-nonyl mercaptan, pentaphenylethane, isooctyl 3-mercapto-propionate, 4-methylbenzenethiol, bromotrichloromethane, carbon tetrabromide, and carbon tetrachloride. Suitable chain transfer agents are described in detail, for example, by K. C. Berger and G. Brandrup in J. Brandrup, E. H. Immergut, Polymer Handbook, 3rd edition, John Wiley & Sons, New York, 1989, pp. II/81-II/141.

The optional solvents for the radical polymerization reaction can be polar solvents, nonpolar solvents, or a combination comprising at least one of the foregoing. Examples of polar solvents include water, methanol, propanol, hexanol, octanol, hexylene glycol, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, or a combination comprising at least one of the foregoing. Examples of nonpolar solvents include hexane, toluene, xylene, gasoline, diesel, crude oil, oil from plants such as palm oil and vegetable oil, or a combination comprising at least one of the foregoing. The solvents, if used, are selected such that they do not dissolve the specific container material used for a particular radical polymerization reaction.

The compounds in the unsaturated monomer components and the radical polymerization components can be premixed before being introduced into the temporary containers. In an embodiment, the unsaturated monomer components and the radical polymerization components are charged into at least one or a series of continuous stirred tank reactors or a static mixer, where the unsaturated monomers are allowed to at least partially react forming oligomers having a desired molecular weight or viscosity before being introduced into the temporary containers. Alternatively the individually components in the unsaturated monomer components and the radical polymerization components are separately added into the temporary containers.

Multiple temporary reactors can be used. In an embodiment, different temporary containers can be independently charged with different unsaturated monomer components and/or different radical polymerization components. For example, out of all the temporary containers that are used to make drag reducing agents, 0.1 wt % to 99.9 wt % of the temporary containers are charged with a composition that leads to a drag reducing agent with a lower molecular weight, while the rest of the containers are charged with a composition that leads to a drag reducing agent having a higher molecular weight. Without wishing to be bound by theory, it is believed that the polymer particles with lower molecular weight dissolve sooner or earlier in the pipeline and the polymer particles with higher molecular weight dissolve later or further along the pipeline, therefore, the bi-modal and multi-modal molecular weight distributions are beneficial to the performance of the drag reducing agents.

Once charged with the unsaturated monomer components and the radical polymerization components, the temporary containers are sealed. A "form, fill, and seal" packaging device can be used. For polymerization reactions that are sensitive to oxygen and/or moisture, the fill and seal can be conducted under an inert atmosphere.

The sealed temporary containers are placed in an environment that can be used to control the reaction temperature. Depending on the initiator used, heat may be required to generate the radicals that are required to initiate the polymerization. After the reaction is initiated, heat generated during the reaction may need to be removed from the temporary container. The environment can be an inert environment. Advantageously, the container material can be selected and constructed to be an excellent oxygen and/or moisture barrier such that oxygen and/or water do not diffuse into the temporary containers while the unsaturated monomer components are polymerized therein. Thus the environment does not necessarily have to be an inert environment, and oxygen and/or moisture can be present around the sealed temporary container during the polymerization reaction.

The environment can be a liquid bath comprising a heat transfer fluid. Heat transfer fluids can include water, a hydrocarbon such as an aromatic solvent, an alcohol, a glycol, silicon oil, or a combination comprising at least one of the foregoing. Exemplary heat transfer fluids include toluene, xylene, propanol, octanol, glycol such as hexylene glycol and ethylene glycol, silicone oil, isoparaffinic hydrocarbons such as ISOPAR™ fluids available from ExxonMobil, other synthetic hydrocarbons such as THERMINOL™ D-12 heat transfer fluid and THERMINOL™ VLT heat transfer fluid available from EASTMAN, or a combination comprising at least one of the foregoing. Optionally the liquid bath is agitated or circulated to improve heat transfer.

Alternatively or in addition, the environment can include circulated gas such as circulated air, nitrogen, carbon dioxide, argon, and the like to improve heat transfer at −100° C. to 200° C., preferably, at −40° C. to 150° C.

Heat and/or electromagnetic energy can be used to initiate and control the radical polymerization process in sealed temporary containers. As used herein, electromagnetic energy includes light of a certain wavelength (visible, infrared light, ultra-violet light), magnetic wave (microwave), radiation, or a combination thereof.

The sealed temporary containers can be placed in a liquid bath or a circulated gas environment at −100° C. to 200° C. for 0.001 to 200 hours to allow the monomers to polymerize. Preferably the sealed temporary containers are placed in an environment at about −40° C. to about 150° C. for about 10 minutes to about 24 hours.

After the unsaturated monomer components inside the temporary containers reach a certain conversion percent and/or the polymerization product reaches a certain conversion or a certain molecular weight, the radical polymerization reaction can be terminated. In an embodiment, greater than about 70 wt % or greater than about 80 wt % of the unsaturated monomer components are polymerized. The desired molecular weight of drag reducing agents can range from about 1 million to about 50 million Daltons, preferably from about 10 million to about 50 million Daltons. The molecular weight of the polymerized product is estimated by the inherent viscosity. Methods of estimating molecular weight with inherency viscosity are known and have been described in U.S. Pat. No. 5,449,732, and Production Chemicals for the Oil and Gas Industry ($2^{nd}$ Edition) by Malcolm A. Kelland.

Depending on the applications of the drag reducing agents, it may or may not necessary to remove the container materials after the polymerization stops. If needed, the temporary containers can be either fully or partially removed by at least dissolving the container material in a solvent. Advantageously, the drag reducing agents are solids, and the solvent only selectively dissolves the container material but not the drag reducing agents, therefore, the solvent with the dissolved container material can be separated from the polymer product. Suitable solvents can be polar solvents, nonpolar solvents, or a combination comprising at least one of the foregoing. Exemplary polar solvents include water, methanol, propanol, hexanol, octanol, hexylene glycol, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, or a combination comprising at least one of the foregoing. Water can be in the form of steam. Exemplary nonpolar solvents include hexane, toluene, xylene, gasoline, diesel, crude oil, oil from plants such as palm oil and vegetable oil, or a combination comprising at least one of the foregoing.

Optionally the container material is dissolved in the presence of an acid or base. Exemplary acids include acetic acid, formic acid, p-toluene sulfonic acid, carbonic acid, $CO_2$, HCl, $H_2SO_4$, $H_3PO_4$, or a combination comprising at least one of the foregoing. Exemplary bases include NaOH, KOH, $Na_2CO_3$, $K_2CO_3$, ammonia, $NaHCO_3$, $KHCO_3$, or a combination comprising at least one of the foregoing. When an acid or base is used, the container material may be dissolved in a much faster rate. If desired, a rinse process with alcohols such as methanol, propanol, hexanol, octanol, hexylene glycol, and/or water or a neutralization process can be used to remove the residual acid/base catalysts after the container material is dissolved. Any neutralization process known to a person skilled in the art can be used. For example, one can use an acid to neutralize a base and use a base to neutralize an acid.

The temperature of the solvent used to dissolve the container material is not particularly limited and can be about −100° C. to about 200° C. or about 20° C. to about 100° C.

Advantageously, the dissolved container material and its solvent can be a part of the drag reducing agent formulation without any significantly negative impact on performance and stability.

The drag reducing agents obtained in the sealed temporary containers are ground to form particulate drag reducing agents. The particulate drag reducing agents can have a particle size of about 1 micron to about 1,500 microns, about 50 to about 1,500 microns, or about 75 to about 750 microns.

Before the grinding or during the grinding process, the initiators and metal catalysts may be removed or deactivated by washing with solvents, reacting with air, oxygen, and/or water.

Grinding can be conducted under cryogenic grinding conditions or non-cryogenic grinding conditions. Under cryogenic grinding conditions, the grinding process temperature is typically below the glass transition temperatures of the drag reducing agent polymers. Anti-agglomerating agents may be needed to prevent the ground particulate drag reducing agent polymers from agglomeration under ambient temperature.

Under non-cryogenic grinding conditions, the grinding process temperature is typically above the glass transition temperatures of the drag reducing agent polymers, preferably at ambient temperature. Anti-agglomerating agents, viscosifiers, additional polymers, and non-solvents may be added to form a suspension before grinding. Optionally surfactants may be added before or after the grinding step.

The anti-agglomerating agents that can be used include, but not limited to wax, talc, alumina, ethylene bis(stearamide), magnesium stearate, long chain alcohols, long chain ethoxylates, and the like and mixtures thereof. The wax can be a natural wax or a synthetic wax. Examples of suitable naturally occurring wax materials include beeswax, candelilla wax, carnauba wax, ozokerite wax, ceresine wax, montan wax. Synthetic waxes include paraffin waxes, and polymers under the tradenames VYBAR™ and POLYWAX™. Long chain alcohols are the alcohols that have 10 to 30 or 12 to 25 carbon atoms, preferably the ones that are solids at ambient temperature. Exemplary long chain alcohols include the ones under the tradenames UNILIN. Long chain ethoxylates can have 10 to 30 carbon atoms. Long chain ethoxylates are commercially available under the tradenames UNITHOX.

Viscosifiers can increase the viscosity of compositions and therefore facilitate non-cryogenic grinding. Viscosifiers can also been added after cryogenic grinding to adjust the viscosity of the final formulation. Viscosifiers are not particularly limited and can include any of those known to a person skilled in the art. Examples of viscosifiers include, but not limited to, polyacrylamide and its co-polymers and derivatives, polyvinyl alcohol and its co-polymers and derivatives, starches and modified starches, chitosan and its derivatives, cellulose and its derivatives, diutan gum, guar gum, or a combination comprising at least one of the foregoing.

Examples of non-solvents include water, methanol, propanol, hexanol, octanol, propylene glycol, diethylene glycol, hexylene glycol, methyl ethers of such glycols, dichloromethane (DCM), tetrahydrofuran (THF), ethyl acetate, acetone, dimethylformamide (DMF), acetonitrile (MeCN), dimethyl sulfoxide (DMSO), nitromethane, propylene carbonate, ammonia, formic acid, acetic acid, hexane, toluene, xylene, gasoline, diesel, crude oil, oil from plants such as palm oil and vegetable oil, or a combination comprising at least one of the foregoing.

Optionally surfactants can be added to facilitate the distribution and dissolving of the drag reducing agents in crude oil along the pipelines. Since the surfactants are added after the radical polymerization is completed, they do not interfere with the polymerization reaction. Surfactants added to DRA formulations can be anionic surfactants, cationic surfactants, non-ionic surfactants, and polymeric surfactants. Specific examples of surfactants include, but not limited to, fatty alcohol ethoxylates, alkylphenol ethoxylates, fatty acid ethoxylates, ethoxylated fatty esters and oils, ethoxylated amines and/or fatty acid amides.

Optionally additional polymers can be added before, during, or after the grinding step. The additional polymers are that polymers that can be used as drag reducing agents for crude oil and finished fuel. Such additional polymers include but not limited to different polymers made via the process described herein and the high molecular weight polyolefins made with the Ziegler-Natta catalysts and the coordination polymerization that are also known and have been described, for example, in U.S. Pat. No. 7,119,132. Without wishing to be bound by theory, it is believed that incorporating the drag reducing agent polymer particles with different compositions, different molecular weight distributions, made from different processes into drag reducing agent formulations is beneficial to the performance of the drag reducing agents.

Figure 1:
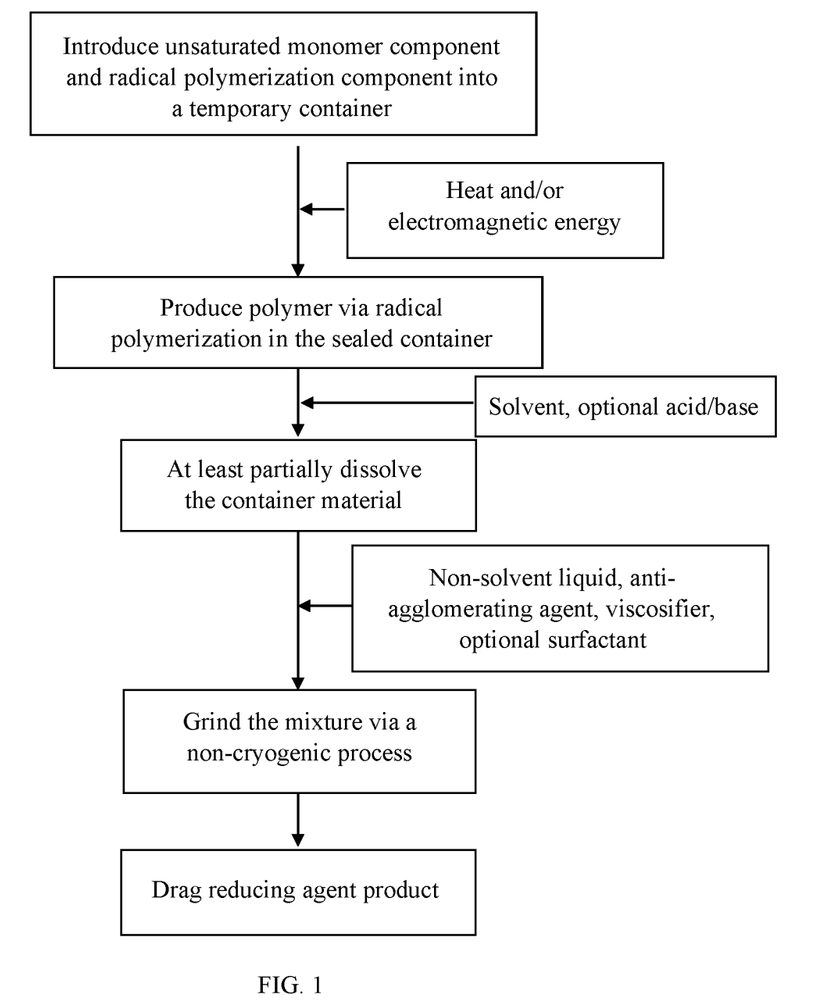
FIG. 1 is a process diagram illustrating a process of making a drag reducing agent product via radical polymerization in a sealed temporary container where the temporary container is at least partially dissolved before the drag reducing agent is ground via a non-cryogenic grinding process.

Examples of specific processes of making compositions containing drag reducing agents are illustrated in FIGS. 1-4. Referring to FIG. 1, after the drag reducing agents are formed in the sealed temporary containers, the sealed temporary containers are at least partially dissolved to provide a first intermediate. The first intermediate is then combined with a non-solvent, an anti-agglomerating agent, a viscosifier, and optionally a surfactant to provide a second intermediate. The second intermediate is ground via a non-cryogenic process thereby forming the composition comprising a particulate drag reducing agent.

Figure 2:
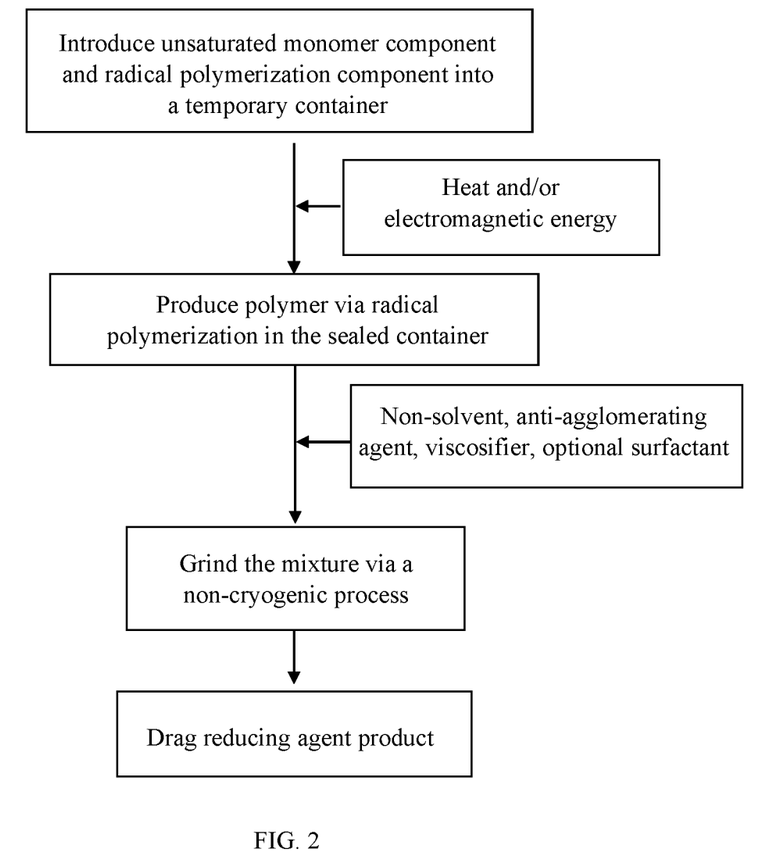
FIG. 2 is a process diagram illustrating another process of making a drag reducing agent product via radical polymerization in a sealed temporary container where the drag reducing agent and the temporary container are ground together in a non-cryogenic grinding process.

Referring to FIG. 2, after the drag reducing agents are formed, the sealed temporary containers and the drag reducing agents formed therein are ground together in the presence of a non-solvent, an anti-agglomerating agent, a viscosifier, and optionally a surfactant via a non-cryogenic process to form the composition comprising the particulate drag reducing agent.

Figure 3:
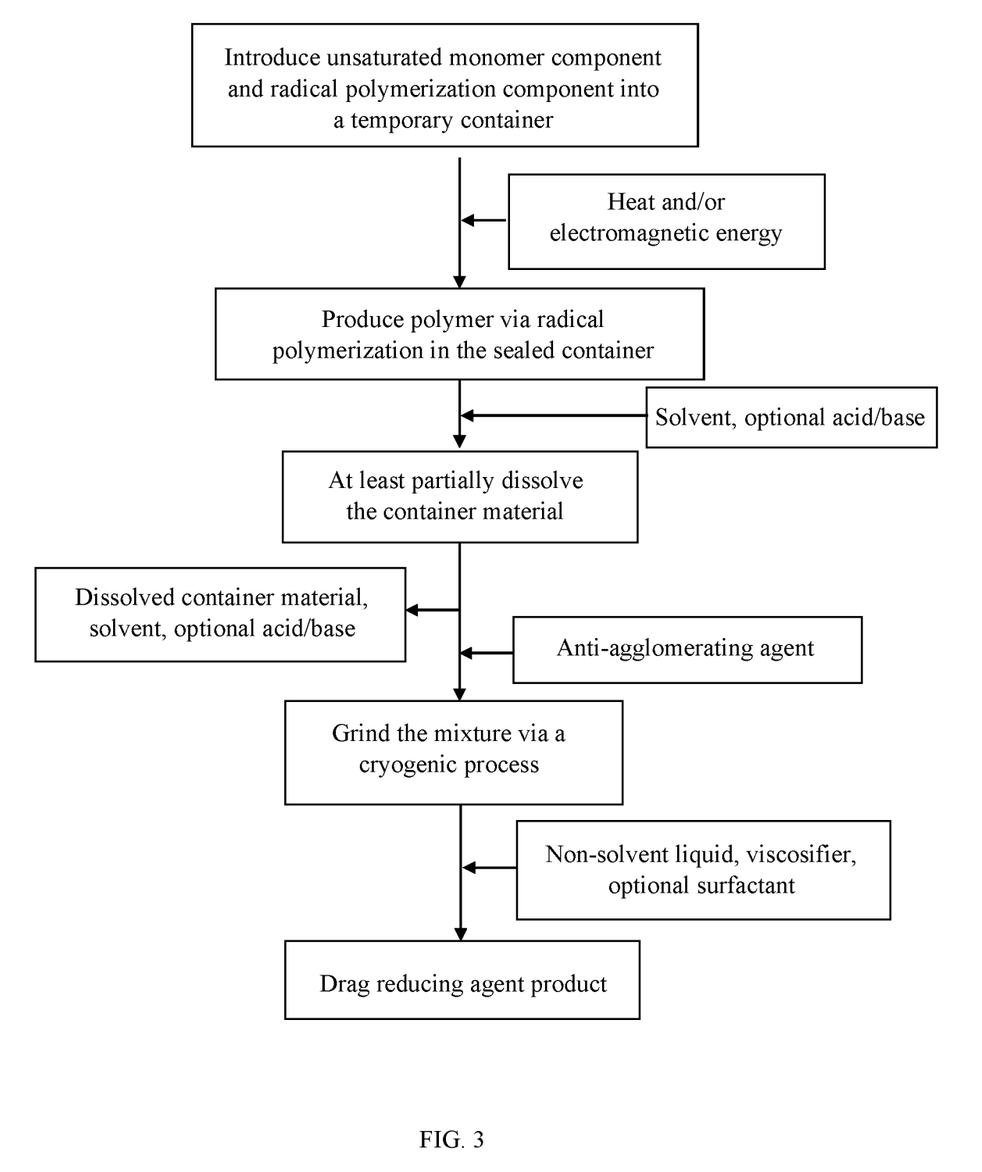
FIG. 3 is a process diagram illustrating yet another process of making a drag reducing agent product via radical polymerization in a sealed temporary container where the container material is at least partially removed before the drag reducing agent is ground via a cryogenic grinding process.

Referring to FIG. 3, the drag reducing agents are at least partially dissolved after the drag reducing agent is formed. The dissolved container material is then removed by filtration or a centrifuge for example to provide a first intermediate containing the drag reducing agent. The first intermediate is then ground in the presence of an anti-agglomerating agent via a cryogenic process to form a second intermediate comprising the particulate drag reducing agent. The second intermediate can be combined with a non-solvent, a viscosifier, and optionally a surfactant thereby to form the composition comprising the particulate drag reducing agent.

Figure 4:
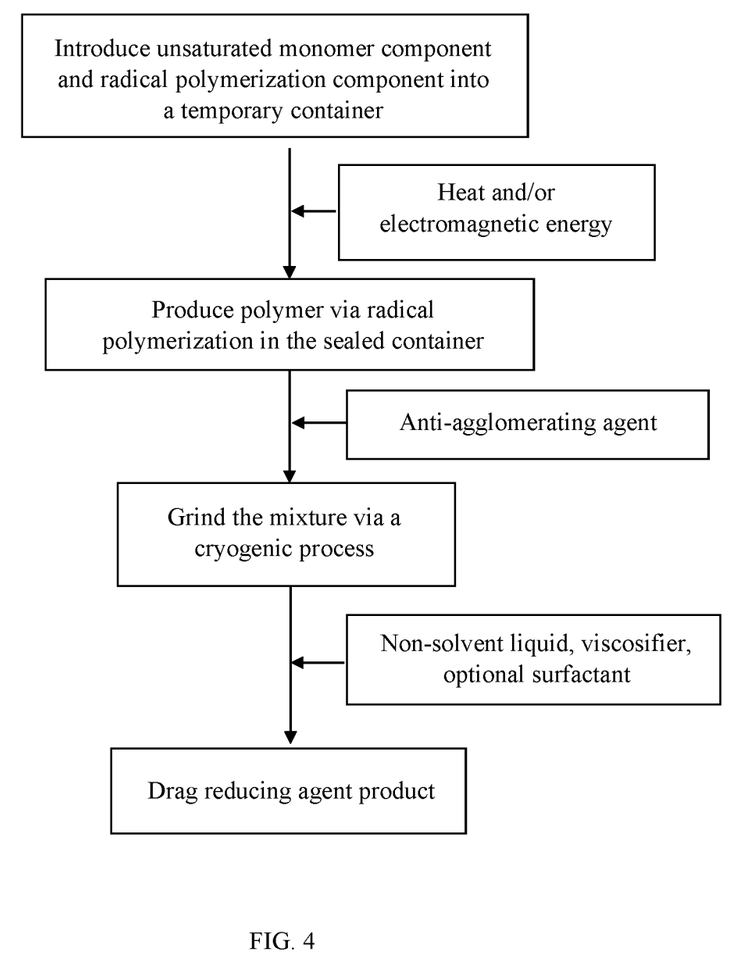
FIG. 4 is a process diagram illustrating still another process of making a drag reducing agent via radical polymerization in a sealed temporary container where the drag reducing agent and the temporary container are ground together in a cryogenic grinding process.

Referring to FIG. 4, after the drag reducing agents are formed, the sealed temporary containers containing the drag reducing agents therein can be ground in the presence of an anti-agglomerating agent via a cryogenic process. The ground products can be combined with a non-solvent, a viscosifier, and optionally a surfactant to form the composition comprising the particulate drag reducing agent.

The compositions comprising the particulate drag reducing agent contain about 0.5 wt % to about 80 wt % of the particulate drag reducing agent, about 0.1 wt % to about 40 wt % of an anti-agglomerating agent; about 0.001 wt % to 19.99 wt % of a viscosifier; and about 20 wt % to about 90 wt % of a non-solvent.

Preferably the compositions can comprise, based on the total weight of the composition, about 15 wt % to about 40 wt % of the particulate drag reducing agent; about 0.1 wt % to about 10 wt % of the anti-agglomerating agent; about 0.001 wt % to about 8.99 wt % of the viscosifier; about 26 wt % to about 85 wt % of the non-solvent; and optionally about 0.1 wt % to 10 wt % or about 0.1 to about 5 wt % of the surfactant.

The particulate drag reducing agent can further comprise a polyolefin that is made with the Ziegler-Natta catalysts and the coordination polymerization, and having a molecular weight of about 1 million to about 50 million. A weight ratio of the particulate drag reducing agent made from the above mentioned radical polymerization process to the polyolefin made with Ziegler-Natta catalysts and the coordination polymerization is about 99:1 to about 1:99, preferably about 5:1 to about 1:5.

The compositions can also contain about 0.01 wt % to about 10 wt % of a container material as described herein based on the total weight of the compositions.

Set forth below are various embodiments of the disclosure.

Embodiment 1. A process of manufacturing a composition comprising a particulate drag reducing agent, the process comprising: continuously forming a temporary container; introducing an unsaturated monomer component and a radical polymerization component into the temporary container; sealing the temporary container to form a sealed temporary container; allowing the unsaturated monomer component to polymerize in the sealed temporary container to form the drag reducing agent via a radical polymerization reaction, the drag reducing agent having a molecular weight of about 1 million gram/mol to about 50 million gram/mol; and grinding the drag reducing agent to form a composition comprising a particulate drag reducing agent, the particulate drag reducing agent having a particle size of about 1 to about 1,500 microns.

Embodiment 2. The process as in any prior embodiment, wherein the sealed temporary container has a volume of about 1 milliliter to about 10 liters and a wall thickness of about 1 micron to about 2,000 microns.

Embodiment 3. The process as in any prior embodiment, wherein the temporary container is formed from a container material comprising a polyethylene, a polypropylene, an ethylene propylene copolymer, a polystyrene, a polylactic acid, a polyamide, a polyester, a polystyrene, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

Embodiment 4. The process as in any prior embodiment, further comprising initiating the radical polymerization reaction by heat, electromagnetic energy, or a combination comprising at least one of the foregoing.

Embodiment 5. The process as in any prior embodiment, wherein the radical polymerization reaction is an atom transfer radical polymerization; and the radical polymerization component comprises an atom transfer radical polymerization initiator, and an optional component comprising a metal catalyst, a ligand, a photocatalyst, a reducing agent, a solvent, or a combination comprising at least one of the foregoing.

Embodiment 6. The process as in any prior embodiment, wherein the radical polymerization reaction is a reversible addition fragmentation chain transfer (RAFT) polymerization; and the radical polymerization component comprises a RAFT initiator, a RAFT agent, and optionally a solvent.

Embodiment 7. The process as in any prior embodiment, wherein the radical polymerization is a nitroxide mediated polymerization; and the radical polymerization component comprises a nitroxide, a nitroxide mediated polymerization initiator, and optionally a solvent.

Embodiment 8. The process as in any prior embodiment, wherein the radical polymerization is a free-radical polymerization, the radical polymerization component comprises a free-radical initiator, and an optional component comprising a solvent, a chain transfer agent, or a combination thereof; and the process comprises initiating the polymerization reaction via heat or electromagnetic energy.

Embodiment 9. The process as in any prior embodiment, further comprising placing the sealed temporary container in a heat transfer fluid or a circulated gas environment at −100° C. to 200° C. for about 0.001 hour to about 200 hours to allow the unsaturated monomer component to polymerize in the sealed temporary container forming the drag reducing agent.

Embodiment 10. The process as in any prior embodiment, further comprising at least partially dissolving the sealed temporary container after the drag reducing agent is formed to provide a first intermediate; combining a non-solvent, an anti-agglomerating agent, a viscosifier, and optionally a surfactant with the first intermediate to provide a second intermediate; and grinding the second intermediate via a non-cryogenic process thereby forming the composition comprising a particulate drag reducing agent.

Embodiment 11. The process as in any prior embodiment, further comprising grinding the sealed temporary container containing the drag reducing agent in the presence of a non-solvent, an anti-agglomerating agent, a viscosifier, and optionally a surfactant via a non-cryogenic process thereby forming the composition comprising the particulate drag reducing agent.

Embodiment 12. The process as in any prior embodiment, further comprising at least partially dissolving a container material in the sealed temporary container after the drag reducing agent is formed; removing the dissolved container material to provide a first intermediate containing the drag reducing agent; grinding the first intermediate containing the drag reducing agent in the presence of an anti-agglomerating agent via a cryogenic process to form a second intermediate comprising the particulate drag reducing agent; and combining the second intermediate with a non-solvent, a viscosifier, and optionally a surfactant thereby forming the composition comprising the particulate drag reducing agent.

Embodiment 13. The process as in any prior embodiment, further comprising grinding the sealed temporary container containing the drag reducing agent in the presence of an anti-agglomeration agent via a cryogenic process to form an intermediate comprising the particulate drag reducing agent; and combining the intermediate with a non-solvent, a viscosifier, and optionally a surfactant thus forming the composition comprising the particulate drag reducing agent.

Embodiment 14. A composition comprising, based on the total weight of the composition: about 0.5 wt % to about 80 wt % of a particulate drag reducing agent polymerized from a vinyl acetate, styrene, acrylamide, an acrylate, acrylic acid, a derivative thereof, or a combination thereof, the particulate drag reducing agent having a particle size of about 1 micron to about 1,500 microns and a molecular weight of about 1 million to about 50 million gram/mol; about 0.1 wt % to about 40 wt % of an anti-agglomerating agent polymer; about 0.001 wt % to 19.99 wt % of a viscosifier; and about 20 wt % to about 90 wt % of a non-solvent.

Embodiment 15. The composition as in any prior embodiment comprising, based on the total weight of the composition, about 15 wt % to about 40 wt % of the particulate drag reducing agent; about 0.1 wt % to about 10 wt % of the anti-agglomerating agent; about 0.001 wt % to about 8.99 wt % of the viscosifier; about 26 wt % to about 85 wt % of the non-solvent; and optionally about 0.1 wt % to 10 wt % of the surfactant.

Embodiment 16. The composition as in any prior embodiment, wherein the anti-agglomerating agent comprises wax, talc, alumina, ethylene bis(stearamide), magnesium stearate, an alcohol having 10 to 30 carbon atoms, an ethoxylated alcohol having 10 to 30 carbon atoms, or a combination comprising at least one of the foregoing.

Embodiment 17. The composition as in any prior embodiment, wherein the non-solvent comprises water, methanol, propanol, hexanol, octanol, propylene glycol, diethylene glycol, hexylene glycol, methyl ethers of such glycols, dichloromethane, tetrahydrofuran, ethyl acetate, acetone, dimethylformamide, acetonitrile, dimethyl sulfoxide, nitromethane, propylene carbonate, ammonia, formic acid, acetic acid, hexane, toluene, xylene, gasoline, diesel, a crude oil, a plant oil, or a combination comprising at least one of the foregoing.

Embodiment 18. The composition as in any prior embodiment, wherein the viscosifier comprises a polyacrylamide, a copolymer or derivative of the polyacrylamide, polyvinyl alcohol, a copolymer or derivative of the polyvinyl alcohol, starch or a modified starch, chitosan or derivative thereof, cellulose or a derivative thereof, diutan gum, guar gum, or a combination comprising at least one of the foregoing.

Embodiment 19. The composition as in any prior embodiment, further comprising 0.1 wt % to 79.99 wt % of a surfactant based on the total weight of the composition, the surfactant comprising a fatty alcohol ethoxylate, an alkylphenol ethoxylate, a fatty acid ethoxylate, an ethoxylated fatty ester, an ethoxylated amine, a fatty acid amide, or a combination comprising at least one of the foregoing.

Embodiment 20. A composition comprising the particulate drag reducing agent manufactured by a process according to any of prior embodiment and a polyolefin that is made with a Ziegler-Natta catalyst and a coordination polymerization and having a molecular weight of about 1 million to about 50 million gram/mol, wherein a weight ratio of the particulate drag reducing agent manufactured by a process according to any of prior embodiment relative to the polyolefin made with the Ziegler-Natta catalyst and the coordination polymerization is about 99:1 to about 1:99, preferably about 5:1 to about 1:5.

Embodiment 21. The composition as in any prior embodiment, further comprising, based on the total weight of the composition, 0.01 wt % to 10 wt % of a container material, wherein the container material comprises a polyethylene, a polypropylene, an ethylene propylene copolymer, a polystyrene, a polylactic acid, a polyamide, a polyester, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A process of manufacturing a composition comprising a particulate drag reducing agent, the process comprising:
    continuously forming a temporary container;
    introducing an unsaturated monomer component and a radical polymerization component into the temporary container;
    sealing the temporary container to form a sealed temporary container;
    allowing the unsaturated monomer component to polymerize in the sealed temporary container to form the drag reducing agent via a radical polymerization reaction, the drag reducing agent having a molecular weight of about 1 million gram/mol to about 50 million gram/mol; and
    grinding the drag reducing agent to form a composition comprising a particulate drag reducing agent, the particulate drag reducing agent having a particle size of about 1 to about 1,500 microns,
    wherein the temporary container is coated with wax, a silicone, a phenolic resin, or a combination comprising at least one of the foregoing.

2. The process of claim 1, wherein the sealed temporary container has a volume of about 1 milliliter to about 10 liters and a wall thickness of about 1 micron to about 2,000 microns.

3. The process of claim 1, wherein the temporary container is formed from a container material comprising a polyethylene, a polypropylene, an ethylene propylene copolymer, a polystyrene, a polylactic acid, a polyamide, a polyester, an ethylene vinyl acetate copolymer, an ethylene vinyl alcohol copolymer, a polyvinylpyrrolidone, an ethylene vinylpyrrolidone copolymer, a vinylpyrrolidone vinyl acetate copolymer, a polyvinyl acetate, a polyvinyl alcohol, a polyethylene oxide, a polyethylene glycol, polyvinylidene chloride, a polysaccharide or its derivative, or a combination comprising at least one of the foregoing.

4. The process of claim 1, further comprising initiating the radical polymerization reaction by heat, electromagnetic energy, or a combination comprising at least one of the foregoing.

5. The process of claim 1, wherein
    the radical polymerization reaction is an atom transfer radical polymerization; and
    the radical polymerization component comprises an atom transfer radical polymerization initiator, and an optional component comprising a metal catalyst, a ligand, a photocatalyst, a reducing agent, a solvent, or a combination comprising at least one of the foregoing.

6. The process of claim 1, wherein the radical polymerization reaction is a reversible addition fragmentation chain transfer (RAFT) polymerization; and the radical polymerization component comprises a RAFT initiator, a RAFT agent, and optionally a solvent.

7. The process of claim 1, wherein the radical polymerization is a nitroxide mediated polymerization; and the radical polymerization component comprises a nitroxide, a nitroxide mediated polymerization initiator, and optionally a solvent.

8. The process of claim 1, wherein the radical polymerization is a free-radical polymerization, the radical polymerization component comprises a free-radical initiator, and an optional component comprising a solvent, a chain transfer agent, or a combination thereof; and the process comprises initiating the polymerization reaction via heat or electromagnetic energy.

9. The process of claim 1, further comprising placing the sealed temporary container in a heat transfer fluid or a circulated gas environment at −100° C. to 200° C. for about 0.001 hour to about 200 hours to allow the unsaturated monomer component to polymerize in the sealed temporary container forming the drag reducing agent.

10. The process of claim 1, further comprising
at least partially dissolving the sealed temporary container after the drag reducing agent is formed to provide a first intermediate;
combining a non-solvent, an anti-agglomerating agent, a viscosifier, and optionally a surfactant with the first intermediate to provide a second intermediate; and
grinding the second intermediate via a non-cryogenic process thereby forming the composition comprising a particulate drag reducing agent.

11. The process of claim 1, further comprising grinding the sealed temporary container containing the drag reducing agent in the presence of a non-solvent, an anti-agglomerating agent, a viscosifier, and optionally a surfactant via a non-cryogenic process thereby forming the composition comprising the particulate drag reducing agent.

12. The process of claim 1, further comprising
at least partially dissolving a container material in the sealed temporary container after the drag reducing agent is formed;
removing the dissolved container material to provide a first intermediate containing the drag reducing agent;
grinding the first intermediate containing the drag reducing agent in the presence of an anti-agglomerating agent via a cryogenic process to form a second intermediate comprising the particulate drag reducing agent; and
combining the second intermediate with a non-solvent, a viscosifier, and optionally a surfactant thereby forming the composition comprising the particulate drag reducing agent.

13. The process of claim 1, further comprising
grinding the sealed temporary container containing the drag reducing agent in the presence of an anti-agglomeration agent via a cryogenic process to form an intermediate comprising the particulate drag reducing agent; and
combining the intermediate with a non-solvent, a viscosifier, and optionally a surfactant thus forming the composition comprising the particulate drag reducing agent.

* * * * *